United States Patent
Meinel

(10) Patent No.: US 10,546,205 B2
(45) Date of Patent: Jan. 28, 2020

(54) SYSTEM AND METHOD FOR MULTI-MODALITY SEGMENTATION OF INTERNAL TISSUE WITH LIVE FEEDBACK

(75) Inventor: Lina Meinel, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 976 days.

(21) Appl. No.: 13/813,232

(22) PCT Filed: Jul. 25, 2011

(86) PCT No.: PCT/IB2011/053294
§ 371 (c)(1),
(2), (4) Date: Jan. 30, 2013

(87) PCT Pub. No.: WO2012/017350
PCT Pub. Date: Feb. 9, 2012

(65) Prior Publication Data
US 2013/0129177 A1    May 23, 2013

Related U.S. Application Data

(60) Provisional application No. 61/388,016, filed on Sep. 30, 2010, provisional application No. 61/369,813, filed on Aug. 2, 2010.

(51) Int. Cl.
G06K 9/34    (2006.01)

(52) U.S. Cl.
CPC .................................... G06K 9/34 (2013.01)

(58) Field of Classification Search
CPC ................... G06T 7/0093; G06T 2207/20072
See application file for complete search history.

(56) References Cited

U.S. PATENT DOCUMENTS

| 6,078,668 | A | 6/2000 | Poulsen |
| 6,078,688 | A * | 6/2000 | Cox et al. ................. 382/173 |
| 2004/0013305 | A1 | 1/2004 | Brandt et al. |
| 2005/0123196 | A1 | 6/2005 | Paragyios |
| 2006/0228009 | A1 | 10/2006 | Fidrich et al. |

(Continued)

FOREIGN PATENT DOCUMENTS

| CN | 101710420 A | 5/2010 | |
| WO | WO-2009126112 A1 * | 10/2009 | ........... G06K 9/0061 |

OTHER PUBLICATIONS

Spagnolini, 2-D phase unwrapping and phase aliasing, Sep. 1993, Society of Exploration Geophysicists, vol. 58, No. 9.*

(Continued)

*Primary Examiner* — Vincent Rudolph
*Assistant Examiner* — Raphael Schwartz

(57) ABSTRACT

A segmentation system and method include defining (14) a search region by selecting two locations in an image of a structure to be segmented and sampling the search region to provide an unwrapped image. The unwrapped image is edge filtered (20) to determine likely boundary pixels in the image. A directed graph is constructed (22) for the unwrapped image by determining nodes of the graph by computing (24) a lowest cost between boundary pixels. A potential segmentation is generated (26) for user approval using live images. In accordance with a trace by the user, nodes are connected (32) for a final segmentation of the image of the structure to be segmented.

26 Claims, 6 Drawing Sheets

(56) References Cited

U.S. PATENT DOCUMENTS

2007/0092115 A1* 4/2007 Usher ............... G06K 9/00597
382/117
2008/0260221 A1* 10/2008 Unal et al. .................... 382/128

OTHER PUBLICATIONS

Dijkstra, Edsger W. "A note on two problems in connexion with graphs." Numerische mathematik 1.1 (1959): 269-271.*

Fabel, M., et al. "Semi-automated volumetric analysis of lymph node metastases in patients with malignant melanoma stage III/IV—A feasibility study." European radiology 18.6 (2008): 1114-1122.*

Steinkamp, H. J., et al. "Cervical lymphadenopathy: ratio of long-to short-axis diameter as a predictor of malignancy." The British journal of radiology 68.807 (1995): 266-270.*

M.A. Gulsun, "Geometric Modeling of Tubular Structures", Computer Vision and Pattern Recognition Workshops, 2008, CVPR Workshops 2008, IEEE Computer Society Conference on, IEEE, Piscataway, NJ, USA, pp. 1-8.

Zhao, D. et al. "A Method for Segmentation of Pulmonary Nodules on Multi-Slice CT Images", Acta Electronica Sinica, vol. 34, No. 12A, Dec. 2006.

* cited by examiner

SYSTEM AND METHOD FOR MULTI-MODALITY SEGMENTATION OF INTERNAL TISSUE WITH LIVE FEEDBACK

RELATED APPLICATION INFORMATION

This application claims priority to U.S. Provisional Application No. 61/369,813 filed on Aug. 2, 2010, incorporated herein by reference in its entirety.

This disclosure relates to medical imaging and more particularly to systems and methods for segmentation of internal tissue using live feedback.

The status of an axillary lymph node (ALN) is an important prognostic factor in the assessment of new breast cancer patients. The status influences therapy planning. It is currently determined histopathologically by Sentinel lymph node biopsy (SLNB). SLNB is a time-consuming invasive procedure and is the current standard procedure as there is no alternative way of assessing lymph node status. An alternative procedure to SLNB that is more efficient and less uncomfortable for patients would be beneficial.

Multiple imaging modalities are currently used to study primary breast tumors including ultrasound (US) and breast magnetic resonance imaging (BMRI). For ALN assessment, US is accepted in many institutions. However, US might not be accurate in measuring lesion dimensions. It is well known that US is operator dependent, and the reproducibility of the study is not guaranteed. On the other hand, computed tomography (CT) and magnetic resonance imaging (MRI) are reproducible studies and allow for accurate measurements.

Recently, BMRI has been recommended for screening high-risk breast cancer patients as an adjunct to mammography and for the evaluation of the contralateral breast in women recently diagnosed with breast cancer. Since BMRI is increasingly performed nationwide, it is becoming more common to use BMRI to assess ALNs. Thus, because both modalities are being used more frequently in patients with breast cancer, it would be ideal to use information from both US and BMRI in a combined fashion in assessing ALN.

In clinical practice, breast radiologists diagnose the axillary lymph node (ALN) as part of the routine clinical care for all new breast cancer patients. The ALN diagnosis includes measuring the ALN long and short axes and maximum cortical thickness on ultrasound and in magnetic resonance (MR) images. The radiologists' manual measurements are subjective, include human errors and are time-consuming.

Radiologists currently manually measure ALN dimensions. Due to human error in ultrasound measurements, a more reliable and reproducible method is needed for computing ALN size.

In accordance with the present principles, a preoperative and non-invasive procedure for internal tissue assessment and other medical procedures are provided.

A segmentation system and method include defining a search region by selecting two locations in an image of a structure to be segmented and sampling the search region to provide an unwrapped image. The unwrapped image is edge filtered to determine likely boundary pixels in the image. A directed graph is constructed for the unwrapped image by determining nodes of the graph by computing a lowest cost between boundary pixels. A potential segmentation is generated for user approval using live images. In accordance with a trace by the user, nodes are connected for a final segmentation of the image of the structure to be segmented.

A segmentation method includes defining a search region by selecting two locations in an image of a structure to be segmented; sampling the search region to provide an unwrapped image; edge filtering the unwrapped image to determine likely boundary pixels in the image; constructing a directed graph for the unwrapped image by determining nodes of the graph by computing a lowest cost between boundary pixels; generating a potential segmentation for user approval using live images; adjusting boundaries of the potential segmentation using a user tracked cursor in the image; and connecting nodes for a final segmentation of the image of the structure to be segmented by including generated boundaries of the potential segmentation and overriding any generated boundaries of the potential segmentation with boundaries adjusted by the user.

A segmentation system includes a processor and a memory coupled to the processor. The memory stores a segmentation module. The segmentation module is configured to define a search region by selecting two locations in an image of a structure to be segmented; sample the search region to provide an unwrapped image; edge filter the unwrapped image to determine likely boundary pixels in the image; construct a directed graph for the unwrapped image by determining nodes of the graph by computing a lowest cost between boundary pixels; generate a potential segmentation for user approval using live images; and in accordance with a trace by the user, connect nodes for a final segmentation of the image of the structure to be segmented.

A computer workstation for use in medicine includes a segmentation system having a processor and a memory coupled to the processor. A means for a first user input to cause the processor to generate a potential segmentation in response to a user's selection of two or more locations in an image of an anatomical structure. A means for generating a final segmentation in response to a second user input is also included. The means for the first user input and the means for generating a final segmentation include any user interface device or devices and appropriate image processing tools which work in accordance with the segmentation methods described herein.

These and other objects, features and advantages of the present disclosure will become apparent from the following detailed description of illustrative embodiments thereof, which is to be read in connection with the accompanying drawings.

This disclosure will present in detail the following description of preferred embodiments with reference to the following figures wherein.

Figure 1:
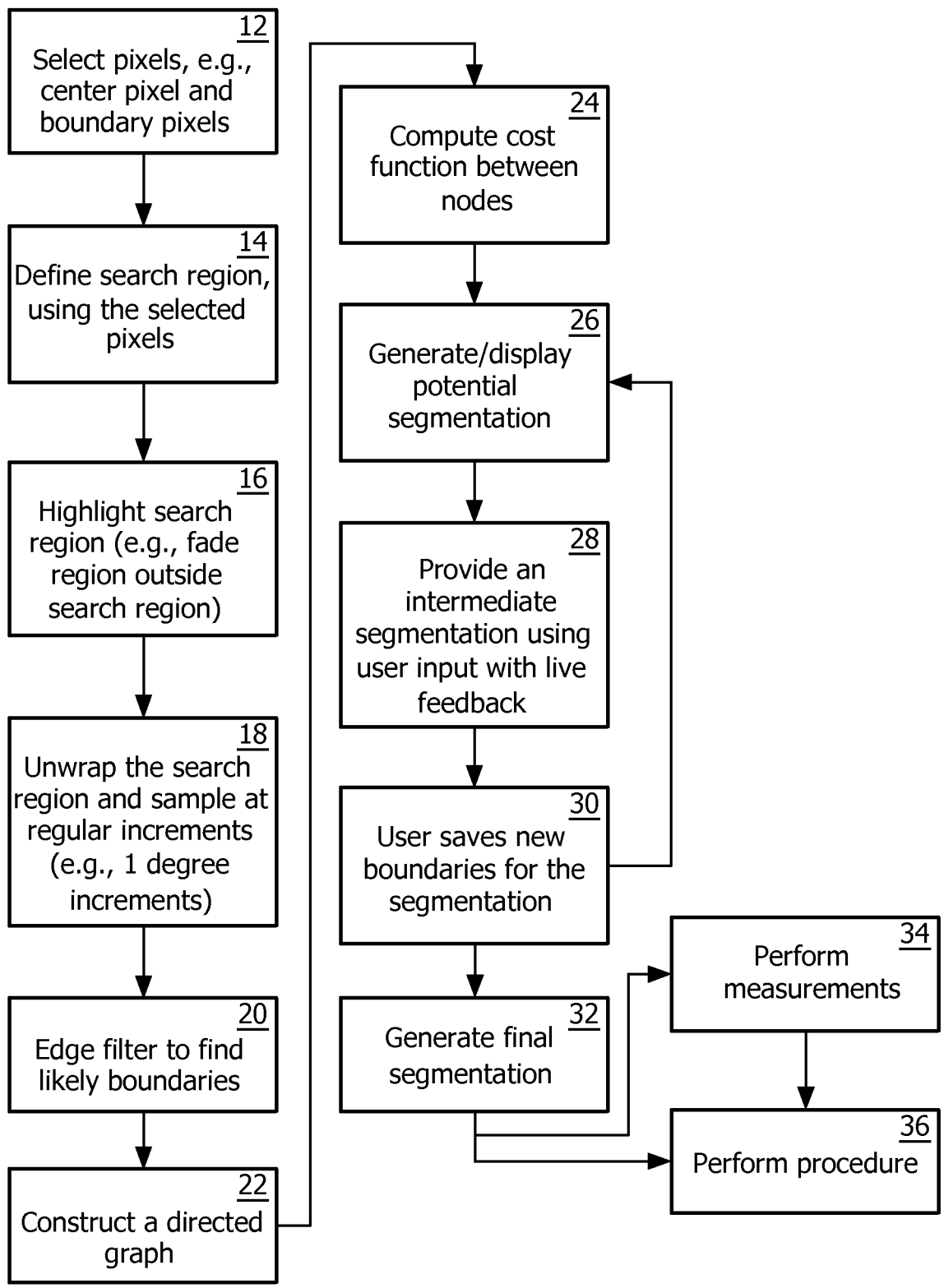
FIG. 1 is a block/flow diagram showing a system/method for segmentation in accordance with one illustrative embodiment.

The present principles provide a more objective diagnostic tool and technique that significantly reduces human error, and, in particular, subjective errors associated with conventional imaging methods. In one particularly useful embodiment, a reliable and reproducible system and method segments images from ultrasound (US) and/or breast magnetic resonance imaging (BMRI) with live feedback, to compute axillary lymph node ("ALN") size. For most ALNs, with input from a user, the present embodiments can measure the ALN: long and short axes, maximum cortical thickness, ALN cortex area, ALN hilum area, ratio of ALN hilum and cortex areas, and asymmetric value that are needed for ALN diagnosis.

The present principles make ALN diagnosis more objective, eliminate human error, and streamline radiologists' clinical workflow by reducing a number of tasks needed for ALN diagnosis. The present principles can be integrated as a feature in existing tool suites and consoles, e.g., the present embodiments may be part of an Integral Breast Workspace, part of a 2D/3D Philips™ US scanners, all Philips™ MRI scanners (e.g., as a software feature) and all Philips™ CT scanners and workstations that need to compute measurements for axillary, abdominal, chest, neck lymph nodes or other internal structures. The present segmentation methods may also work on other imaging modalities such as, CT, Mammography, Tomosynthesis, PEM (positron Emission Mammography), and may also be used for other lymph nodes in the body such as: abdominal, chest, and neck lymph nodes, etc. or other internal structures.

It should be understood that the present invention will be described in terms of axillary lymph nodes; however, the teachings of the present invention are much broader and are applicable to any devices or methods employed in tracking or analyzing complex biological or mechanical systems. In particular, the present principles are applicable to internal tracking procedures of biological systems and procedures in all areas of the body such as the lungs, gastro-intestinal tract, excretory organs, blood vessels, etc. The elements depicted in the FIGS. may be implemented in various combinations of hardware and software and provide functions which may be combined in a single element or multiple elements.

The functions of the various elements shown in the FIGS. can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), non-volatile storage, etc.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams and the like represent various processes which may be substantially represented in computer readable storage media and so executed by a computer or processor, whether or not such computer or processor is explicitly shown.

Furthermore, embodiments of the present invention can take the form of a computer program product accessible from a computer-usable or computer-readable storage medium providing program code for use by or in connection with a computer or any instruction execution system. For the purposes of this description, a computer-usable or computer readable storage medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Referring now to the drawings in which like numerals represent the same or similar elements and initially to FIG. 1, a block/flow diagram shows a system/method for performing a diagnostic procedure and, in particular, segmenting a lymph node using live feedback in accordance with the present principles. In block 12, a user initiates segmentation by defining a search area, e.g., selecting a center of a lymph node, and a boundary pixel in a displayed image. The displayed image may include one or more of an MRI, US, CT or other type of digital image. If images from multiple imaging modes are employed, the method may be applied to each image mode separately, or the multiple images may be registered, and the method applied to the registered images. In block 14, the two points are used to define a search region. In one embodiment, a circular region is selected centered with the center pixel with twice the radius as the selected boundary pixel. In block 16, the search region is highlighted. For example, the user is shown this search region by 'fading' all image intensity values outside the region. For example, [img(x,y)=(img(x,y)+avg)/2]. This highlights a circular region about the center pixel.

In block 18, the search region is 'unwrapped' by sampling radially at regular increments, e.g., 1 degree increments. Unwrapping may include converting, e.g., from polar to Cartesian coordinates. In block 20, an edge filter, such as, e.g., a Canny filter, is applied to the unwrapped image to find likely boundary pixels, e.g., boundary pixels may have a different attribute, such as color or texture. In block 22, a directed graph is constructed for the unwrapped image. The graph includes a node for every pixel. Each node is connected to its five neighbors, e.g., in directions North, Northeast, East, Southeast, South. A weight given to each graph edge is determined by whether a target node is a potential boundary pixel (from block 20) and whether the traversal is direct or diagonal. Traversing to an "edge" node has a cost, traversing to a "non-edge" pixel has a different cost, and traversing diagonally has yet a different cost. Weights and costs may depend on the circumstances and application.

In block 24, the user-selected boundary pixel is taken as a start node, and a cost function, such as, Dijkstra's minimum cost path, is computed to all other nodes. In block 26, an initial destination is selected as the pixel immediately adjacent in a remaining direction (e.g., in a West direction) of the selected boundary pixel. The path thus determined is then shown to the user as a potential segmentation. In block 28, as the user moves the mouse around the image, the nearest node is found, and the path to that pixel from the current start node is determined. This gives an intermediate segmentation and live feedback to the user.

In block 30, when the user clicks a computer mouse button, e.g., the left-mouse button, the current pixel is chosen as a 'fixed' entry in the segmentation. This location becomes the new start node, and the computation for blocks 26 and 28 is performed again. In this fashion, the user is able to override the default segmentation in regions that may be difficult to identify, but the user is not required to input every pixel. In many instances, the user only needs to supply the first two pixels, and the path will be automatically computed in a sufficient manner. In block 32, a final segmentation result is achieved.

In block 34, the digital image with the segmented structure may be employed to make measurements and/or perform a medical procedure, e.g., biopsy, removal etc. in block 36.

Figure 2A:
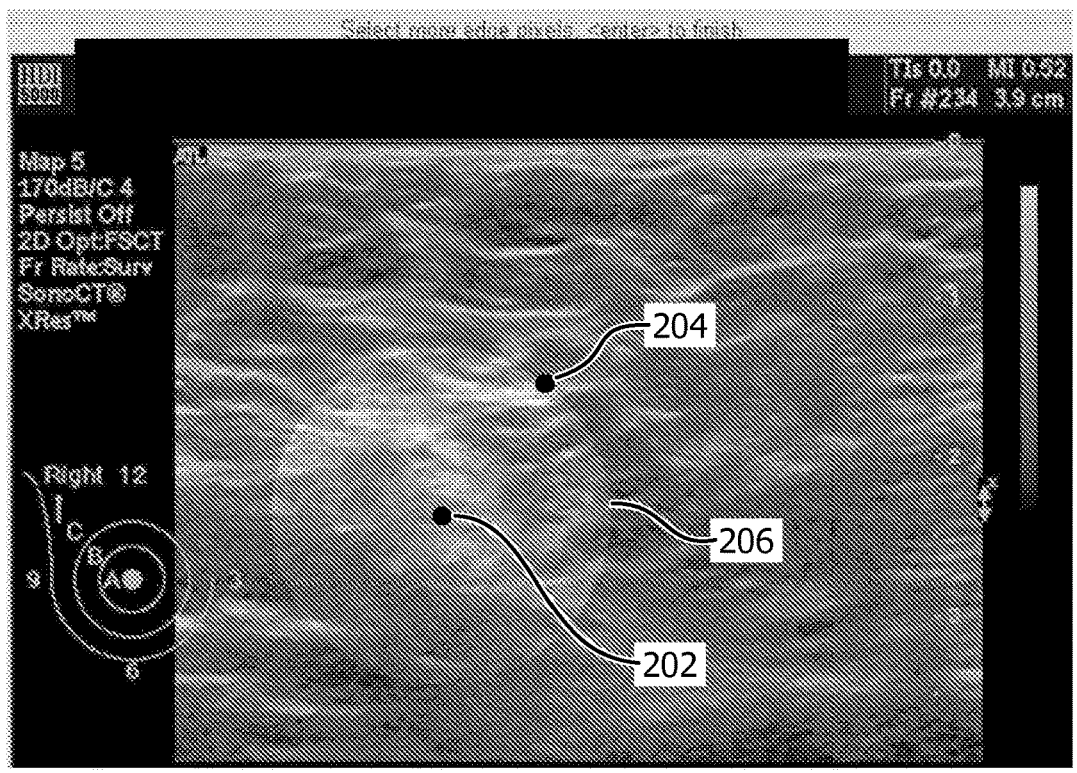
FIG. 2A is an ultrasound image showing two dots placed to define a search region in accordance with the present principles.
Figure 2B:
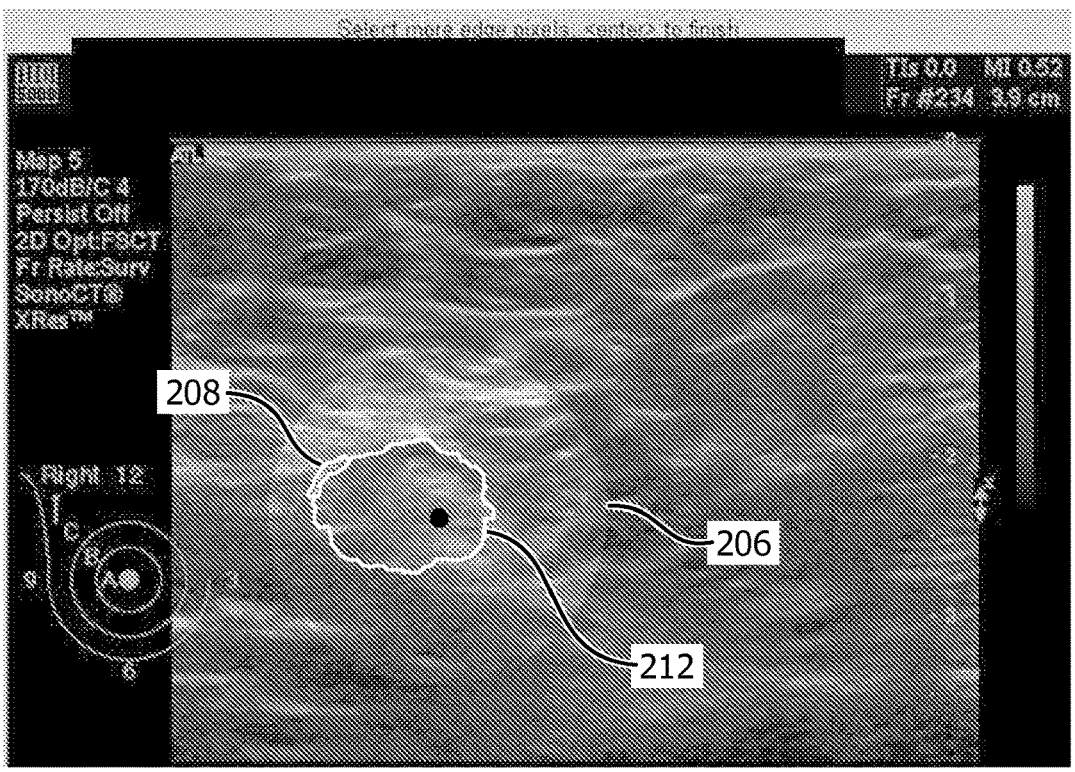
FIG. 2B is an ultrasound image showing a potential boundary adjustment to define a segmentation in accordance with the present principles.
Figure 2C:
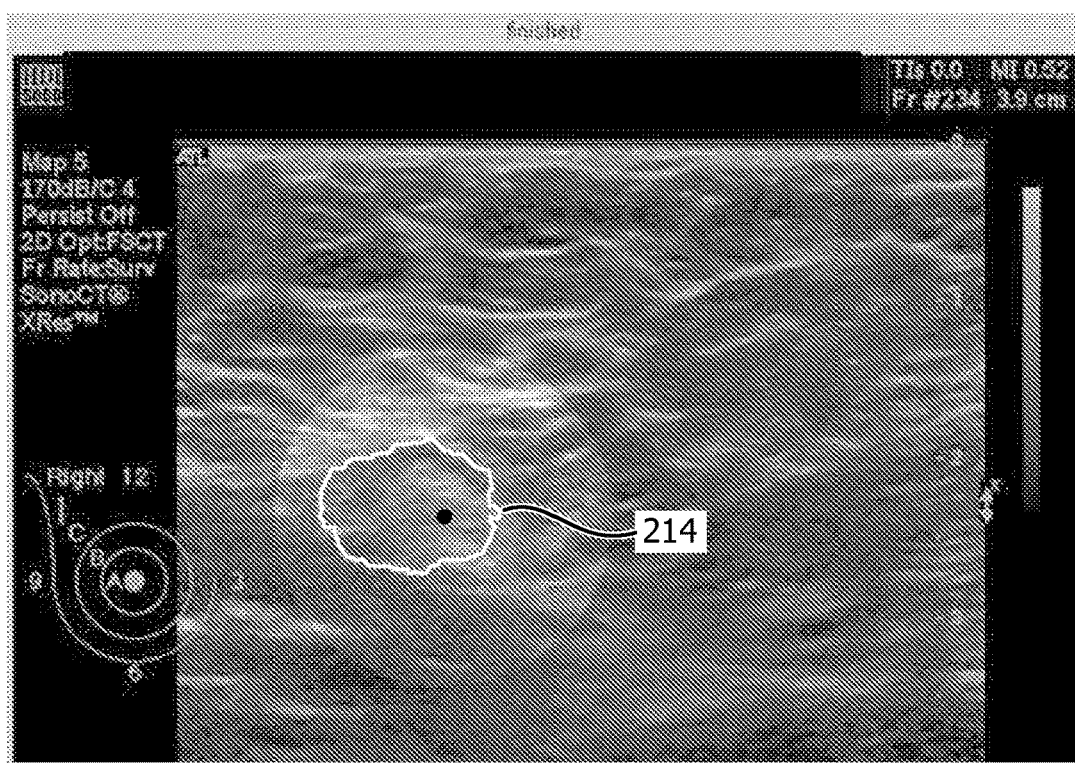
FIG. 2C is an ultrasound image showing a final segmentation in accordance with the present principles.

Referring to FIGS. 2-3, images (e.g., FIGS. 2A-2C show ultrasound images, and FIGS. 3A-3F show magnetic resonance images) are depicted to further illustrate an imaging procedure in accordance with the present principles.

In FIG. 2A, an original US image of an ALN is shown. In FIG. 2B, a user initiates the segmentation method of FIG. 1 by placing a center pixel (dot 202), and a boundary pixel (dot 204). The user is shown a search region (circle 206) by fading the image outside the circular search area, and the potential segmentation in a line 212. A line 208 shows the live feedback. The user will make the decision of keeping the live feedback 208 and/or potential segmentation 212 or simply changing it by placing another seed pixel. In FIG. 2C, a final segmentation result is shown as a line 214.

Figure 3A:
FIG. 3A is a magnetic resonance image showing a region of interest defined before defining a search region in accordance with the present principles.
Figure 3B:
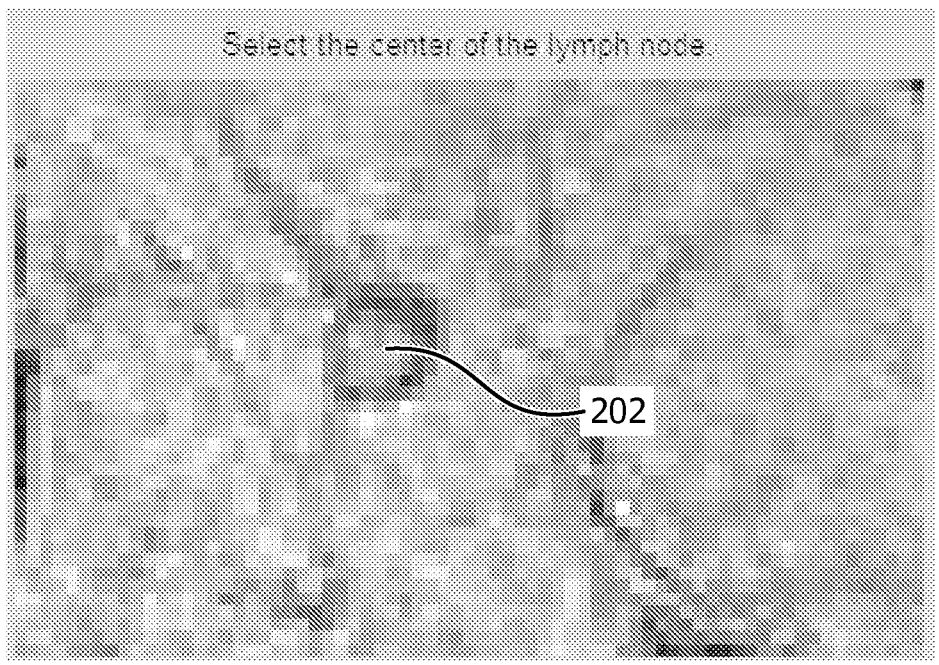
FIG. 3B is a magnetic resonance image showing the region of interest of FIG. 3A magnified in accordance with the present principles.
Figure 3C:
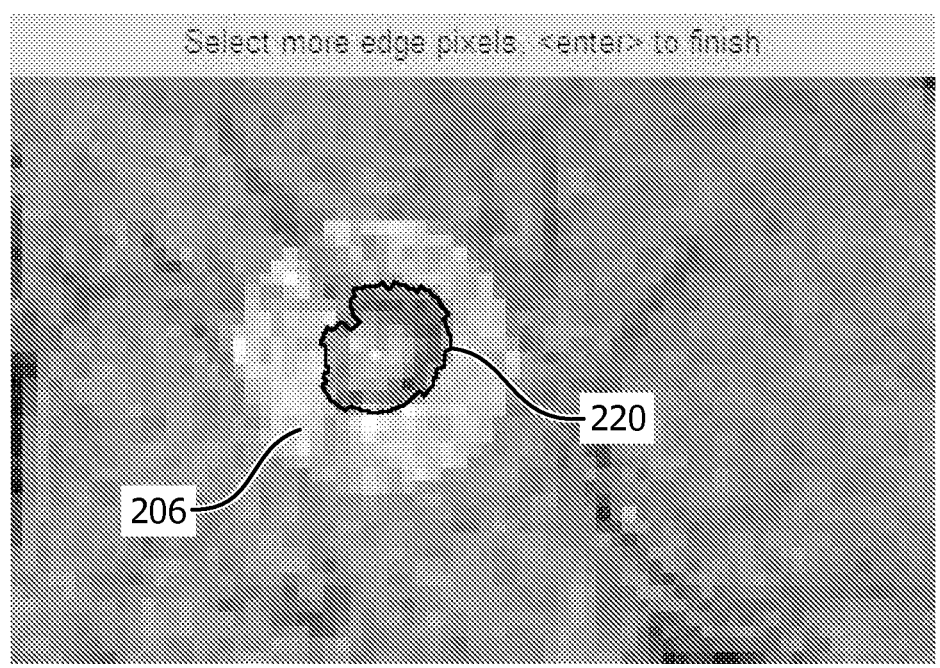
FIG. 3C is a magnetic resonance image showing a search region defined in accordance with the present principles.
Figure 3D:
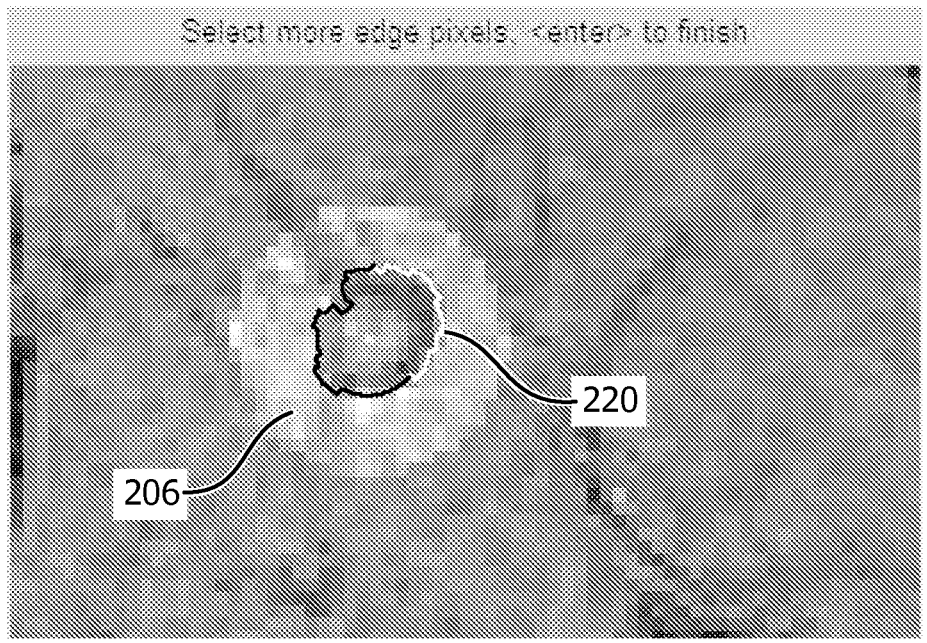
FIG. 3D is a magnetic resonance image showing a potential boundary adjustment to define a segmentation in accordance with the present principles.
Figure 3E:
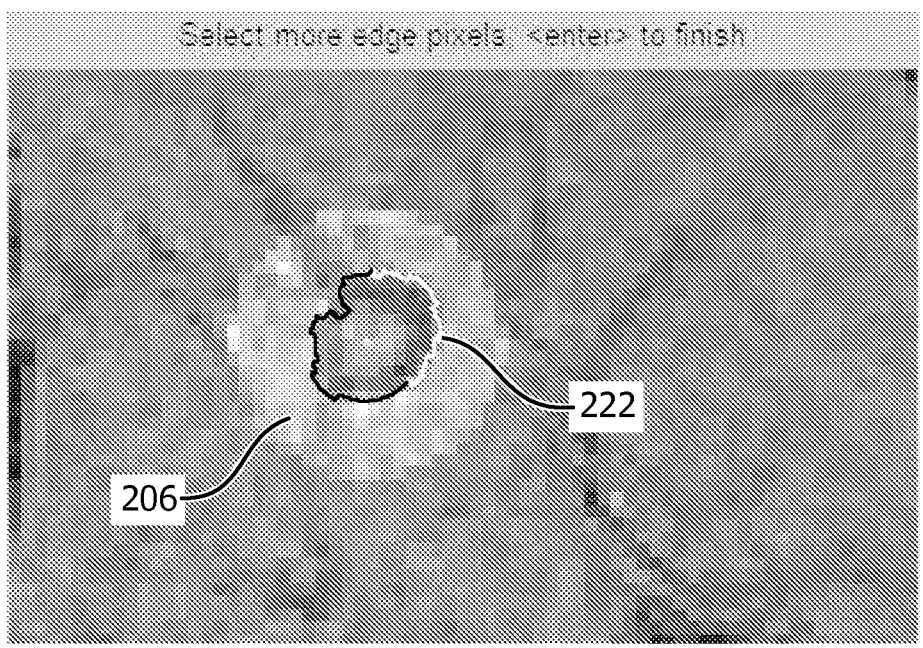
FIG. 3E is a magnetic resonance image showing a final segmentation in accordance with the present principles.
Figure 3F:
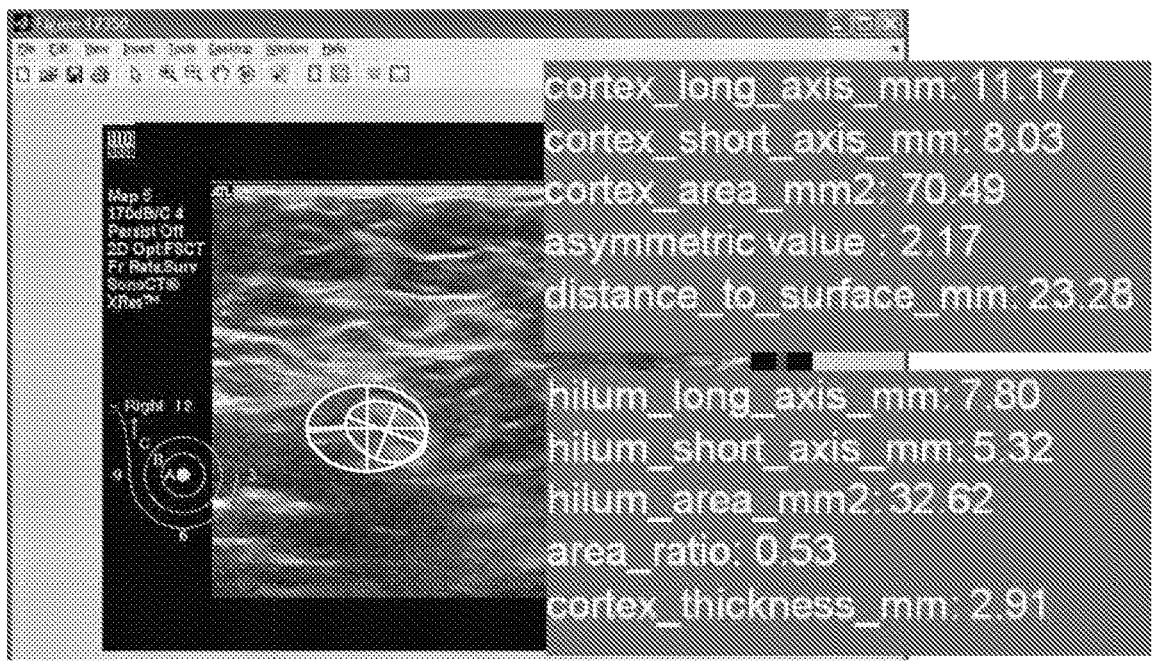
FIG. 3F is an image illustratively showing automatic measurements being taken using the image in accordance with the present principles.

The segmentation method of FIG. 1 can be applied on MR images. In FIG. 3A, an original MR image shows ALNs. An additional zoom may be needed for MRIs to mimic the clinical practice. The user places a region of interest (ROI) shape 216, e.g., a box, around the ALN. A zoomed-in image is shown to the user as depicted in FIG. 3B. In FIGS. 3C and 3D, segmentation is performed as in blocks 30 and 32 of FIG. 1. Edge pixels are selected to create a boundary 220. In FIG. 3E, a final segmentation result 222 on the MR image is depicted. An example of measuring ALN long and short axes, maximum cortical thickness, ALN cortex and hilum areas, and asymmetric value for ALN diagnosis after using the segmentation method is illustratively shown in FIG. 3F.

In accordance with the present principles, the present embodiments assist in making ALN or other internal tissue structure diagnosis more objective, eliminate human errors, and streamline radiologists' workflow in the clinic by reducing the number of clicks needed for the diagnosis. E.g., for most ALNS, with four clicks the user can measure ALN: long and short axes, maximum cortical thickness, ALN cortex area, ALN hilum area, ratio of ALN hilum and cortex areas, and asymmetric value that are needed for ALN diagnosis.

Figure 4:
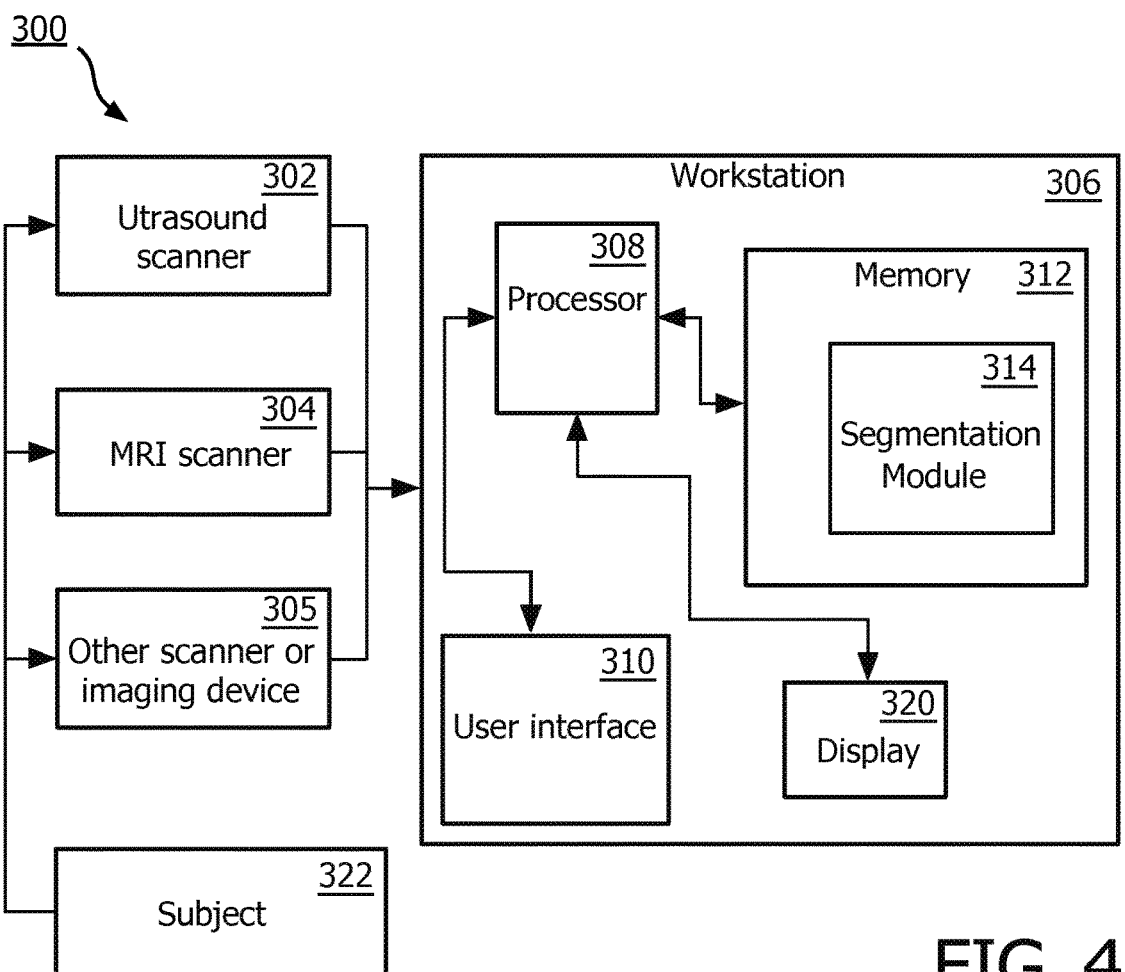
FIG. 4 is a block/flow diagram showing a system for segmentation in accordance with another illustrative embodiment.

Referring to FIG. 4, a system 300 for providing a multi-modality segmentation method with live feedback is illustratively depicted. In the embodiment depicted, system 300 may include an ultrasound work station or scanner 302 or an MRI scanner 304. While these scanners are illustratively depicted for system 300, any scanner or imaging equipment 305 may be employed to provide a live feed back image during organ or structure segmentation, e.g., CT, mammography, etc. A work station or console 306 is provided and may include a computer processor 308, a display 320, a user interface 310 (including, e.g., a mouse, keyboard, touch screen, etc.) and memory 312 for storing data and software. The software may include an image processing and segmentation module 314 configured to generate dots and lines for segmenting structures in images as described with reference to FIG. 1 during a live procedure.

System 300 achieves real-time visualization of ultrasound and/or MR images to permit a user to identify and segment lymph nodes, cancers, other organs or biomaterial internal to a body. The software module 314 is configured to alter regions in the images to permit highlighting of a region of interest, zooming, and making measurements of a finally segmented structure. In particularly useful embodiments, the system 300 may include an Integral Breast Workspace and/or include a 2D/3D Philips™ US scanner, and/or a Philips™ MRI scanner.

Images are collected from one or more scanners 302, 304, 305, etc. and fed to the workstation 306 to provide live images. While viewing the images on a display 320, the user runs the segmentation module 314 and interacts with the images through the user interface 310 to identify and segment an organ or other structure within a subject 322, such as, e.g., a patient.

In accordance with the present principles, three radiologists manually measured the long-axis, short-axis and maximum cortical thickness (MCT) of 13 ALNs (62% positive) on ultrasound and then breast MR images. The segmentation method in accordance with the present principles to efficiently and interactively delineate the ALNs cortex and hilum on both modalities with live feedback, and automatically compute the measurements was also employed.

The user initiated the segmentation by selecting the center of the ALN, and a boundary pixel. A directed graph was constructed for the unwrapped image, and the Dijkstra's minimum cost path was computed. As the user moves the mouse around the image, a nearest node was found, and the path to that pixel from a current start node was determined. This gave an intermediate segmentation and live feedback to the user. The user was capable of choosing the current pixel as a 'fixed' entry in the segmentation. This location became the new start node, and the user was able to override the default segmentation in regions that may be hard to identify, but they are not required to input every pixel. The ALNs average and standard deviation were computed on both modalities for the manual and computerized methods.

The long axis, short axis, and MCT measurements between a US and MRI-T2 weighted sequence (P>0.05) for both manual and computerized measurements and between manual and computerized measurements on each modality were compatible. Accordingly, the advantages of the present principles, e.g., efficiency, reduction in human error, ease of use, etc. are provided without loss of accuracy and highly improve the procedure. The computerized multi-modality segmentation method with live feedback can help make ALN diagnosis more objective, repeatable and efficient.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function; and e) no specific sequence of acts is intended to be required unless specifically indicated.

Having described preferred embodiments for systems and methods for multi-modality segmentation with live feedback (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the embodiments disclosed herein as outlined by the appended claims. Having thus described the details and particularity required by the patent laws, what is claimed and desired protected by Letters Patent is set forth in the appended claims.

The invention claimed is:

1. A segmentation method, comprising:
defining a search region by permitting a user to initiate segmentation by selecting two points in an image of a structure to be segmented;
sampling the search region radially to provide an unwrapped image;
edge filtering the unwrapped image to determine likely boundary pixels in the image;
constructing a directed graph for the unwrapped image by determining nodes of the graph by computing a lowest cost between boundary pixels;
generating a candidate live feedback indicator for user approval;
generating a candidate segmentation indicator for user approval directly adjacent the live feedback indicator by using live images based on a path determined by the directed graph; and
in accordance with a trace by the user, automatically connecting nodes for a final segmentation of the image of the structure to be segmented.

2. The method as recited in claim 1, wherein the two points include two pixels in the image, said pixels comprising a center pixel of the structure and a boundary pixel of the structure.

3. The method as recited in claim 1, further comprising fading pixels outside the search region to highlight the search region.

4. The method as recited in claim 1, wherein sampling the search region includes sampling the search region at one degree intervals.

5. The method as recited in claim 1, wherein computing a lowest cost between boundary pixels includes employing Dijkstra's minimum cost path.

6. The method as recited in claim 1, wherein connecting nodes for a final segmentation includes finding a nearest node to a trace and determining the path to a pixel of the nearest node from a current start node.

7. The method as recited in claim 1, wherein the image of the structure includes one or more of an ultrasound image, a magnetic resonance image and a mammography image.

8. The method as recited in claim 1, wherein the structure includes a lymph node.

9. A segmentation method, comprising:
defining a search region by permitting a user to initiate segmentation by selecting two points in an image of a structure to be segmented;
sampling the search region radially to provide an unwrapped image;
edge filtering the unwrapped image to determine likely boundary pixels in the image;
constructing a directed graph for the unwrapped image by determining nodes of the graph by computing a lowest cost between boundary pixels;
generating a candidate live feedback indicator for user approval;
generating a candidate segmentation indicator for user approval directly adjacent the live feedback indicator by using live images based on a path determined by the directed graph;
adjusting boundaries of the candidate segmentation using a user tracked cursor in the image; and
connecting nodes for a final segmentation of the image of the structure to be segmented by including generated boundaries of the candidate segmentation and overriding any generated boundaries of the candidate segmentation with boundaries adjusted by the user.

10. The method as recited in claim 9, wherein the two points include two pixels in the image, said pixels comprising a center pixel of the structure and a boundary pixel of the structure.

11. The method as recited in claim 9, further comprising fading pixels outside the search region to highlight the search region.

12. The method as recited in claim 9, wherein sampling the search region includes sampling the search region a one degree intervals.

13. The method as recited in claim 9, wherein computing a lowest cost between boundary pixels includes employing Dijkstra's minimum cost path.

14. The method as recited in claim 9, wherein connecting nodes for a final segmentation includes finding a nearest node to a trace and determining the path to a pixel of the nearest node from a current start node.

15. The method as recited in claim 9, wherein the image of the structure includes one or more of an ultrasound image, a magnetic resonance image and a mammography image.

16. The method as recited in claim 9, wherein the structure includes a lymph node.

17. A segmentation method, comprising:
a processor;
a memory coupled to the processor, the memory storing a segmentation module configured to:
define a search region by permitting a user to initiate segmentation by selecting two points in an image of a structure to be segmented;
sample the search region radially to provide an unwrapped image;
edge filter the unwrapped image to determine likely boundary pixels in the image;
construct a directed graph for the unwrapped image by determining nodes of the graph by computing a lowest cost between boundary pixels;
generate a candidate live feedback indicator for user approval;

generate a candidate segmentation indicator for user approval directly adjacent the live feedback indicator by using live images based on a path determined by the directed graph; and in accordance with a trace by the user, automatically connect nodes for a final segmentation of the image of the structure to be segmented.

18. The system as recited in claim 17, further comprising a user interface configured to permit a user to select boundaries for the search region and for the final segmentation.

19. The system as recited in claim 17, wherein a lowest cost between boundary pixels is computed using Dijkstra's minimum cost path.

20. The system as recited in claim 17, wherein the image of the structure includes one or more of an ultrasound image, a magnetic resonance image and a mammography image.

21. The system as recited in claim 17, wherein the structure includes a lymph node.

22. A computer workstation for use in medicine, comprising:

a segmentation system having a processor and a memory coupled to the processor, the memory storing a segmentation module configured to:

radially sample a search region in an image of a structure to be segmented to provide an unwrapped image, the search region defined by a user selecting two points in the image;

edge filter the unwrapped image to determine likely boundary pixels in the image; and construct a directed graph for the unwrapped image by determining nodes of the graph by computing a lowest cost between boundary pixels;

means for a first user input to cause the processor to generate a candidate live feedback indicator for user approval and to generate a candidate segmentation indicator for user approval directly adjacent the live feedback indicator based on a path determined by the directed graph in response to a user's selection of two or more locations in an image of an anatomical structure to define the search region; and means for generating a final segmentation in response to a second user input.

23. The computer workstation of claim 22, wherein the image of an anatomical structure is an ultrasound image, a breast magnetic resonance imaging image or an ultrasound image and a breast magnetic resonance imaging image.

24. The computer workstation of claim 23, wherein the image of an anatomical structure is an ultrasound image and a breast magnetic resonance imaging image, wherein the ultrasound image is registered to the breast magnetic resonance imaging image.

25. The computer workstation of claim 22, wherein the anatomical structure is an axillary lymph node and the segmentation includes a report of axillary lymph node long and short axes, maximum cortical thickness, cortex area, hilum area, ratio of hilum and cortex areas or asymmetric value.

26. The computer workstation of claim 22, wherein the means for a first user input includes means for adjusting the candidate segmentation.

* * * * *